United States Patent [19]

Weil

[11] Patent Number: 5,363,752
[45] Date of Patent: Nov. 15, 1994

[54] COOKING GRILL

[76] Inventor: Fred Weil, 1750 Savannah Hwy., Charleston, S.C. 29407

[21] Appl. No.: 115,426

[22] Filed: Aug. 31, 1993

[51] Int. Cl.⁵ ............................................. A47J 37/06
[52] U.S. Cl. ..................................... 99/445; 99/400; 99/425; 99/446
[58] Field of Search .................... 99/340, 444–446, 99/400, 425, 414, 450, 375; 126/51, 25 R, 41 R

[56] References Cited

U.S. PATENT DOCUMENTS

| 1,007,323 | 10/1911 | Betts | 99/446 |
|---|---|---|---|
| 1,504,102 | 8/1924 | Davis | 99/445 |
| 1,956,387 | 4/1934 | Hartman | 99/446 |
| 3,092,015 | 6/1963 | Tucker et al. | 99/446 |
| 3,308,747 | 3/1967 | Spagnolo | 99/400 |
| 3,422,746 | 1/1969 | Sheinker | 99/446 |
| 3,946,651 | 3/1976 | Garcia | 99/450 X |
| 4,508,024 | 4/1985 | Perkins | 99/340 |
| 4,598,634 | 7/1986 | Van Horn, II | 99/400 |
| 4,658,710 | 4/1987 | Quet et al. | 99/445 |
| 4,936,202 | 6/1990 | Lin | 99/425 |

FOREIGN PATENT DOCUMENTS 0099551 2/1984 European Pat. Off. .............. 99/425

Primary Examiner—Timothy F. Simone
Attorney, Agent, or Firm—B. Craig Killough

[57] ABSTRACT

A cooking grill for cooking over open flame having multiple parallel grids which are capable of displacement relative to each other, with the grids, comprised of channels which are offset from each other. The displacement of the grids and the offset of the channels controls the amount of flame which reaches foods placed upon a top grid.

4 Claims, 4 Drawing Sheets

COOKING GRILL

BACKGROUND OF THE INVENTION

This invention relates to cooking grills or broilers, and is more particularly related to a cooking grill which is used to cook meat over an open flame.

Grills or broilers are commonly used in cooking. Such grills or broilers are characterized by a metal grid onto which meat or other food is placed. A heat source is provided underneath the grill or broiler, and the heat rises to heat the grill and to cook the food. The heat raises the temperature of the grill, and heat rises through the spaces between the members which make up the grid of the grill or broiler.

Heat may be produced by various means. Heat may be produced by electrical resistance, or by burning fuels such as gas, wood or charcoal or other known means.

From ancient times, it has been common to cook over an open flame. In modern times, this open flame is most commonly produced by wood, gas or charcoal. If open flame is used indoors, the open flame is most commonly provided by means of gas.

Outdoor grills or barbecue devices cook over an open flame. The open flame may be provided by burning gas, such as propane, or by using liquid hydrocarbon fuels which in turn ignite solid hydrocarbon fuels, such as charcoal or wood.

Controlling a flame which is provided by burning solid fuels such as charcoal briquets and wood is difficult. While a flow of gas may be regulated, charcoal may flame initially, then the flame dies away. The problem with regulating flames where using charcoal is even greater in that liquid fuels are used to ignite the charcoal and the liquid fuels will flame in an unregulated manner for a period of time. Likewise, wood fires provide a desirable smoke characteristic which is imparted to the food as it is cooked, but it is difficult to regulate the flame.

The problem with cooking over an open flame is compounded by an additional fuel which is added during the cooking process. This additional fuel is grease which falls from the food, and particularly, meat, as the meat is cooked over the open flame. Grease falls onto the charcoal or wood and is absorbed, and then burns from the charcoal or wood in a completely uncontrolled, and usually, undesired, manner. Even with gas grills, flaming and "hot spots" occur in an undesired manner as grease falls into the flame. If the grease does not burn, it presents a sanitation problem.

SUMMARY OF THE PRESENT INVENTION

The grill described herein incorporates two grids. The grids are generally parallel to each other and are located in generally horizontal planes. At least the lower grid is comprised of channels, which are offset from the channels or other corresponding support members, of the upper grid to catch and collect grease which falls from the upper grid. The channels direct grease into a common drainage tray for collection of the grease.

The upper grid may be vertically displaced relative to the heat source in a conventional fashion to control the amount of heat which reaches the food cooking on the grill. The lower grid not only collects grease, it maybe displaced vertically relative to the upper grid and the heat source to control flames from the heat source. Since the channels of the lower grid are offset from the channels, or corresponding members, of the upper grid, by moving the lower grid vertically closer to the upper grid, the channels of the lower grid reduce the effective spacing between the channels, or corresponding members, of the upper grid to control the amount of flame which reaches the food.

DESCRIPTION OF THE PREFERRED EMBODIMENT

Figure 9:
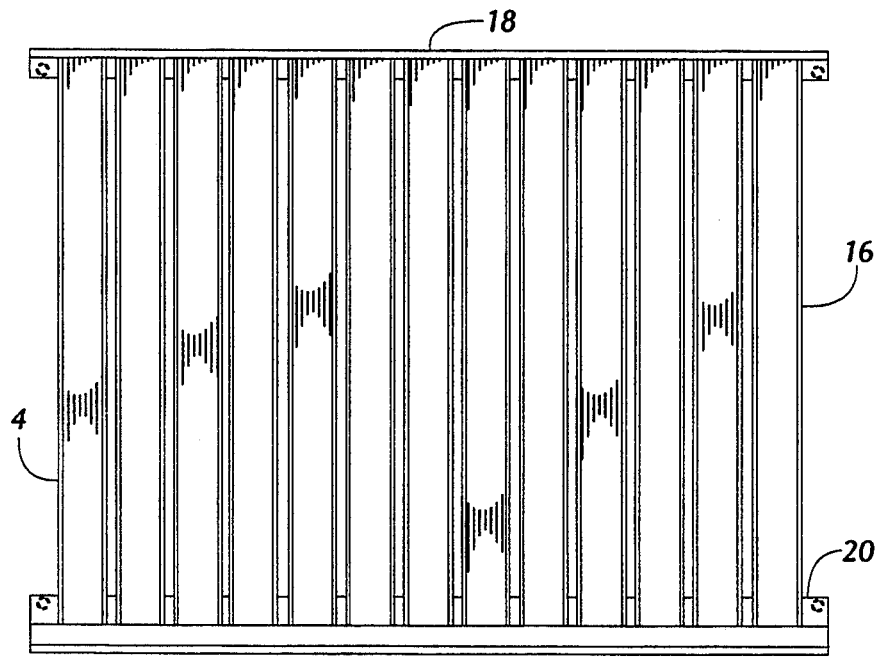
FIG. 9 is a top, plan view of the lower grid.
Figure 10:
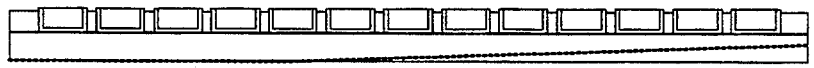
FIG. 10 is a frontal view of the lower grid.
Figure 11:
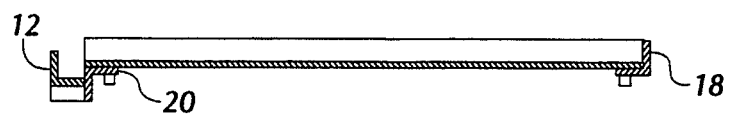
FIG. 11 is a side elevation of the lower grid.

Referring now to the drawing figures, an upper grid 2 and a lower grid 4 are provided. The structure of the lower grid is depicted in FIGS. 9, 10 and 11. The lower grid has a plurality of generally parallel channels 16 which are connected by one or more connecting members 18, 20. In the preferred embodiment, the grid will comprise sufficient channels to yield the desired grid size. In most embodiments, two members running perpendicular to the channels will be sufficient to connect numerous channels. The connecting members may be located at, or near the end of, the channels. The channels will usually be of equal length, but could be of different lengths to conform to various housings.

The channels of the lower grill should be structured to channel melted fat, or grease. In the preferred embodiment, the channels are shown as U-shaped members having a horizontal bottom, with side walls perpendicular thereto. The channels could be other shapes which will collect and transport grease, and accordingly, the channels could be v-shaped, or have a semi-circular cross-section. In the preferred embodiment, the channels of the lower grid are closed at one end by connecting member 18 as shown, while at the opposite end, the connecting member attaches the plurality of channels to each other, and to a grease collection tray 12. The channels remain open at one end so that grease is collected in the channel, and flows from the channels into the grease collection tray, which in turn directs the grease to a collection point.

The upper grid 2 may be constructed similarly to the lower grid. A plurality of channels 6, which are generally parallel to each other, but which have space between them, are connected by connecting members 8,10. The number of channels in the upper grid of the preferred embodiment is approximately equal to the number of channels of the lower grid, so that the channels of the lower grid can collect grease which falls through the spaces in the upper grid at all points. It is not necessary that the upper grid be comprised of channels, as that term is literally and commonly used. While channels are shown in the drawing figures, the upper grid could be formed of a plurality of parallel rods, or other members which may be positioned generally parallel to each other in a spacial relationship so as to support food while cooking. The channels, or other corresponding members, are connected by connection members 8,10 which run generally perpendicular to the channels.

In the preferred embodiment, channels which are similar or identical are used in both the upper grid and the lower grid. Only the points 22, 24 of the channels come in contact with the food. Grease is collected by the upper channels. The channels are heated to cook the food, and the bottom surface of the channels prevents undesired flame from reaching the food as will further be described herein. The use of channels in both the upper and lower grid then achieves a goal of the invention in controlling an open flame by preventing grease from falling into the flame, while also providing barriers which control the amount of flame which reaches the food.

The upper grid may be provided with a grease collection tray. Again, one end of the channels may be closed, such as by the connecting members 8 on the opposite end remains open to allow grease to flow from the channels into a collection tray. A common collection tray may be used by allowing grease to fall from the upper grid to the collection tray of the lower grid.

Figure 2:
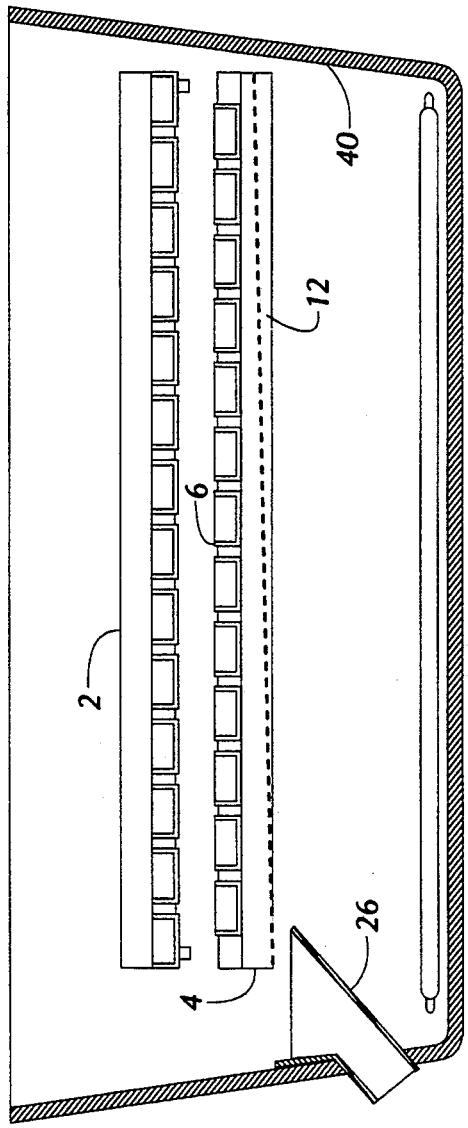
FIG. 2 is a frontal elevation of the cooking grill located in a housing which is shown as sectioned to reveal the grill.
Figure 2A:
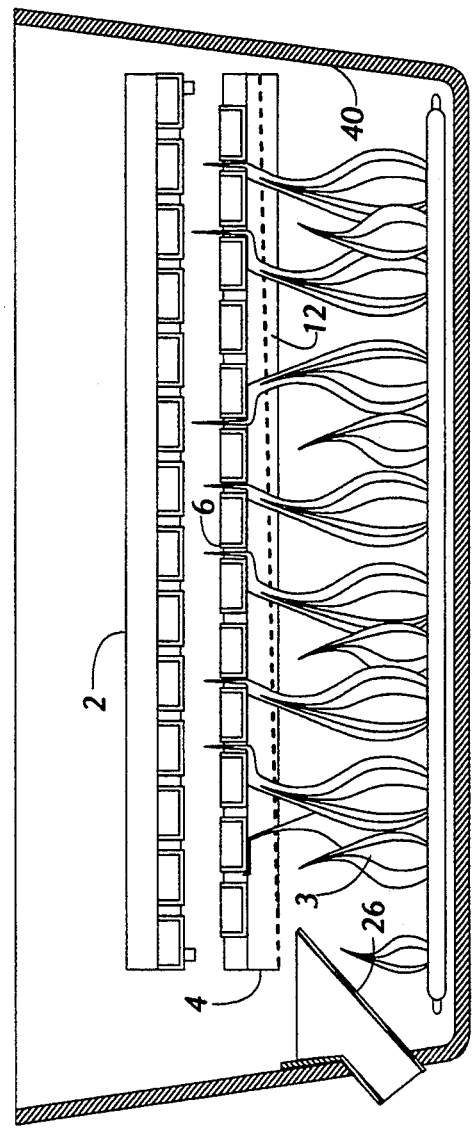
FIG. 2A shows the frontal elevation of FIG. 2, further showing an open flame present underneath lower grid 4.

The grids are constructed as described above form planes. As shown in FIG. 2, these planes are positioned generally horizontally. The grids are positioned so that these planes are generally parallel to each other.

Figure 3:
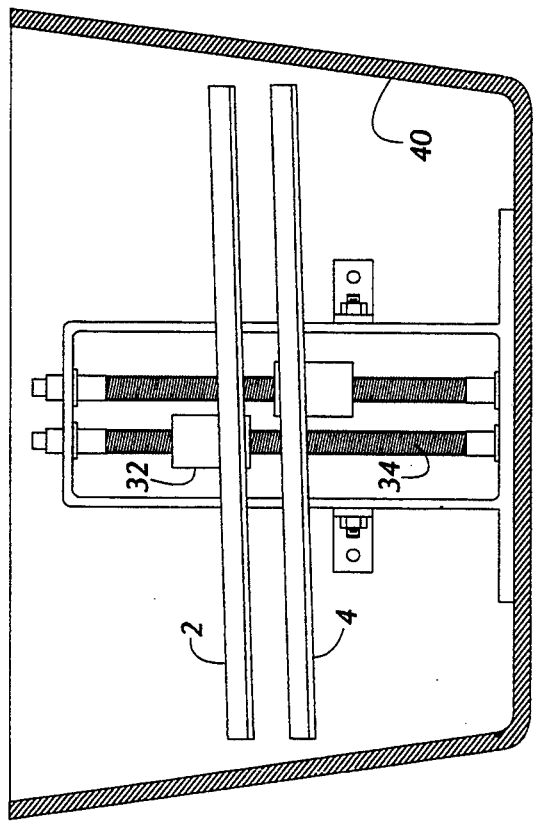
FIG. 3 is a side elevation of the cooking grill, with the housing sectioned to demonstrate the location of the cooking grill within the housing.

As demonstrated by FIG. 3, it is desirable that the grids be positioned generally parallel to each other, but canted a few degrees from horizontal by placing the grids so that one end of each channel is slightly elevated from the opposite end, grease which is collected in the channels is directed toward an end of the channel for collection of the grease by the collection tray. As demonstrated by FIG. 2, the grease collection tray is elevated in the preferred embodiment at one end to direct grease toward a central collection point, or spout 26. Grease is then collected by the channels, with the channels directing grease toward the collection tray, and the collection tray directing the grease to the spout which delivers the grease to the exterior of the housing area.

The upper grid and lower grid may be connected by vertical supports 28,30. They are located at each end of the grid. The supports incorporate means for elevating and lowering the grids relative to the heat source, and for elevating and lower the grids relative to each other.

Figure 1:
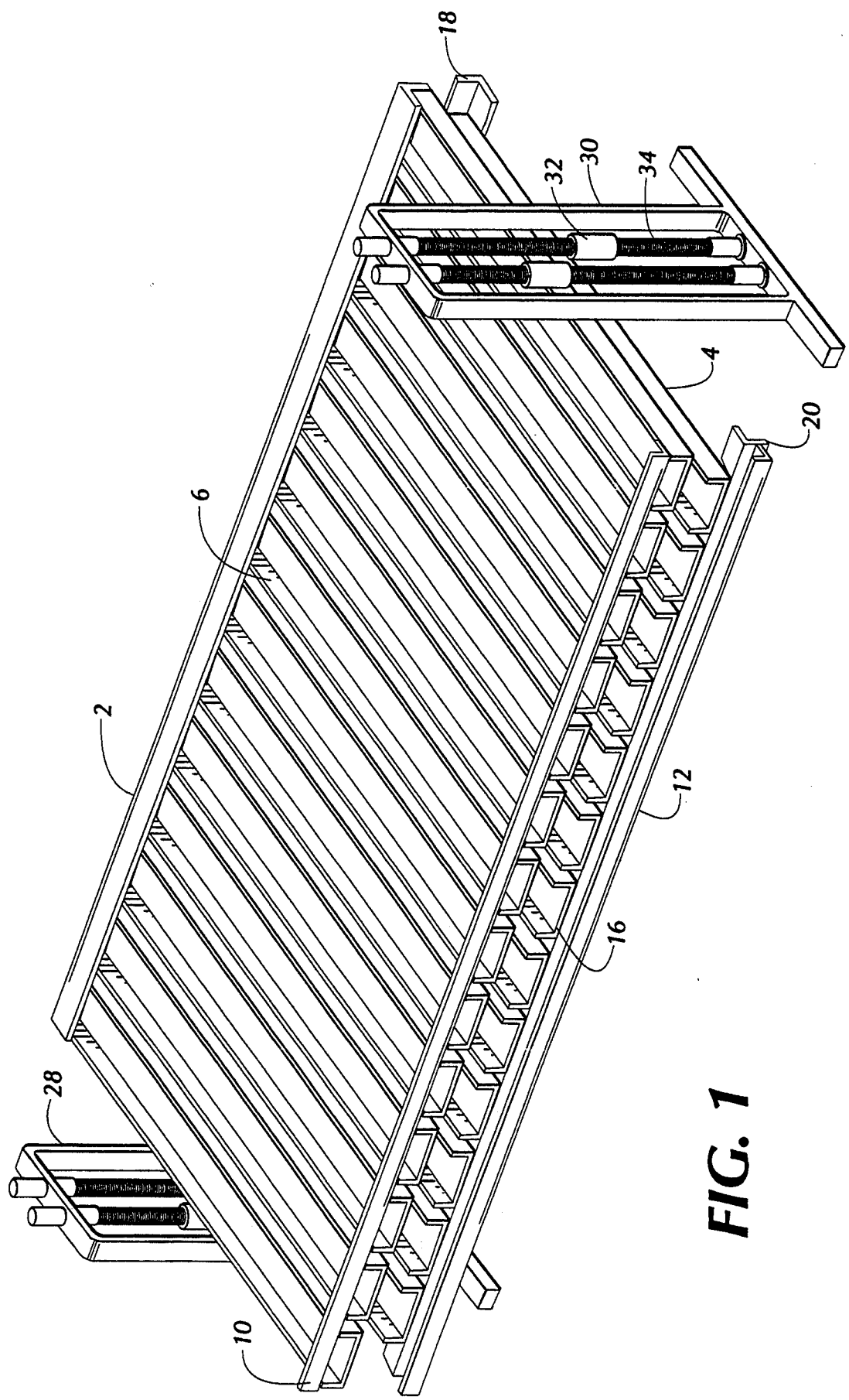
FIG. 1 is a perspective view of the cooking grill.
Figure 5:
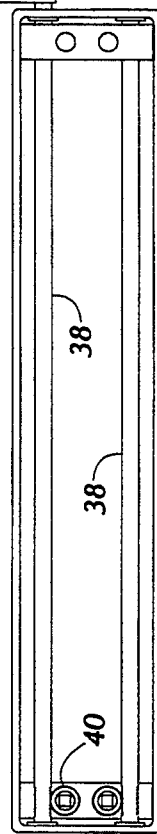
FIG. 5 is a plan view of the mechanism for raising and lowering the grids.
Figure 4:
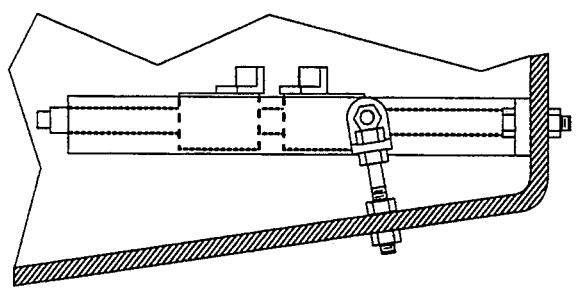
FIG. 4 is partial view showing the mounting of the cooking grill to the housing.
Figure 6:
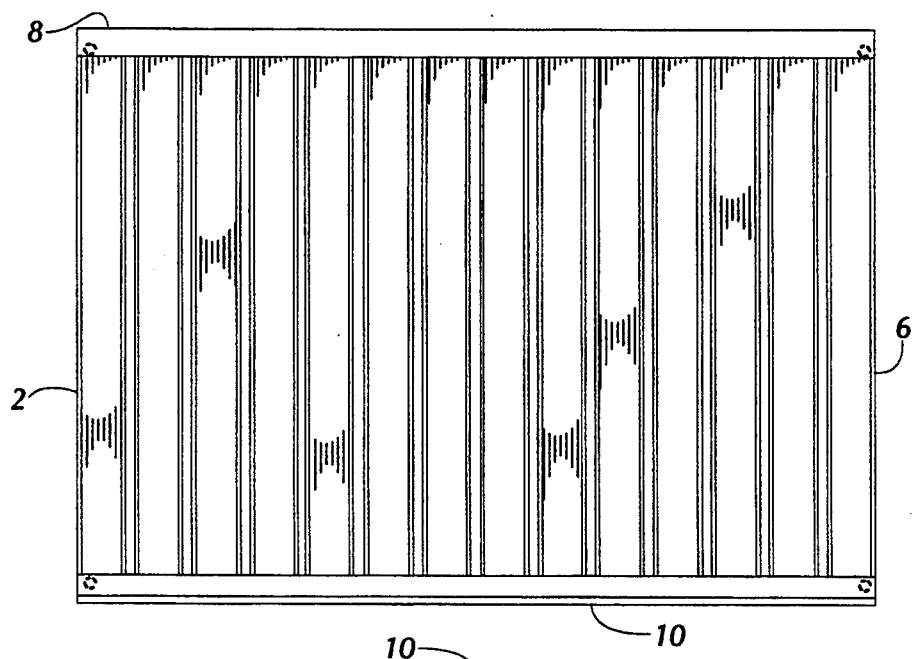
FIG. 6 is a top, plan view of the upper grid.
Figure 7:
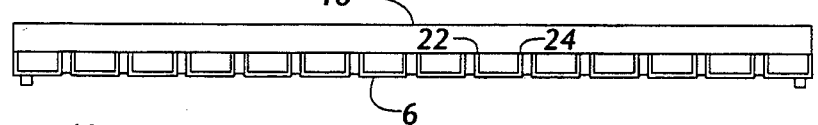
FIG. 7 is a frontal view of the upper grid.
Figure 8:
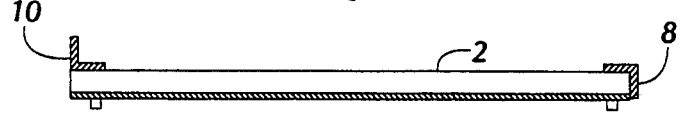
FIG. 8 is a side elevation of the upper grid.

In the embodiment shown in FIGS. 1, 3, and 4, threaded means is provided for raising and lowering the grids. A threaded sleeve 32 is attached to each end of each grid. A threaded screw 34 runs through the threaded sleeve. As the threaded screw is rotated, the engagement with the screw of the threaded sleeve causes the grid to raise or lower, depending on the direction of rotation of the screw. The screws may be rotated simultaneously by the engagement of a gear 38 with the screws as shown in FIG. 5. This gear is actuated by a handle 36, which engages a gear 40 on the screws, causing the screws to rotate simultaneously to move the grids. Any known means of elevating and lowering the grids could be employed. The precise means of elevating and lowering the grids is not critical to the invention; it is only necessary that the grids be capable of being elevated and lowered relative to each other and relative to the open flame.

The cooking grill as described hereinabove may be mounted in a housing 40. The grill cooking assembly could also be mounted over any box or similar structure in which a heating means, and particularly an open flame, may be safely contained. The housing as shown is not critical to the invention, it is only necessary that heat for cooking be provided underneath the grids.

In use, heat is provided to the device. The best mode of using the device is to provide heat by an open flame. For example, charcoal may be placed in the bottom of the housing. Charcoal lighter is sprayed over the charcoal, and ignited. Certain charcoal briquettes which are available are impregnated with a lighter fluid or starter fluid, and they likewise produce substantial flame upon ignition. Similarly, wood may be placed in the bottom of the housing, which, upon ignition, will produce a flame.

With the present invention, it is not necessary to wait until all of the flame disappears upon ignition of the charcoal. It is difficult to regulate the flame from wood, yet, with the present invention, wood may successfully be used as a cooking fuel.

In use, meat is placed on top of the upper grid 2. Other food to be cooked may also be used with the device. However, it is anticipated that the primary use of the present invention is to cook foods having fat which is released when heated.

The flame which reaches the present invention is regulated by the movement of the grids relative to the flame, and relative to each other. The upper grid is positioned so that the desired amount of heat reaches the food to properly cook the food. With conventional grills, however, open flame will burn the surface of the meat, while failing to cook the inside of the meat, the lower grid acts as a barrier to prevent the flame from reaching the food. After the upper grid is positioned to allow the flame to the desired amount of heat to reach the meat, the lower grid is positioned to allow the flame to reach the meat as desired, or to divert the flame away from the meat. The channels of the lower grid are offset from the channels of the upper grid so that the channels of the lower grid and the spacing between the channels of the upper grid are as demonstrated in FIG. 2. Flame 2 from the fire travels through the spaces between the channels 16. If the upper grid and lower grid are spaced relatively far apart, the flame, which is travelling upward, or vertically, will also travel through the spaces between the channels 6 of the upper grid. As the lower grid is elevated toward the upper grid, the flame is diverted horizontally by channels 6. It is the tendency of flame to travel vertically, and not horizontally. As the flame is diverted in a horizontal direction, it is diverted away from the spaces of the upper grid, so that direct flame does not reach the food to burn the outside of the food.

The channels of the upper grid act similarly to a valve. As the lower grid is moved toward the upper grid, flame is retarded from travelling through the spaces of the upper grid, and as the lower grid is moved away from the upper grid, flame is allowed to enter the spaces of the upper grid. If a line is drawn from a space of an upper grid to a closest, or corresponding, space of a lower grid, the angle of this line relative to the horizontal plane of the grids will become more acute as the upper and lower grid are moved toward each other. While the flame does not travel this direct line, this line demonstrates the travel of the flame. Since it is the tendency of the flame to travel vertically, as the flame is required to travel more horizontally by the movement of the upper and lower grid toward each other, the flame tends to be diverted from the spaces of the upper grid. As the flame is diverted by being caused to travel horizontally, the flame will tend to disappear, heating the channels of the upper grid, rather than travelling through the spaces of the upper grid to reach the food.

It should be recalled that the device also controls undesired flame, or flare-ups, caused by grease. The channels of the device divert grease away from the flame, so that only the wood, charcoal, or other fuel is used for cooking rather than the grease which is produced by heating the food.

The present invention provides a cooking grill which allows cooking over open flame by controlling the flame. Undesired flame which is generated by grease produced from fat is diverted away from the heating means so that it does not become an undesired fuel. Open flame may then be controlled by the channels of the upper grid and the offset channels of the lower grid as they are elevated and lowered to allow only the desired amount of flame to reach the food. Open flame, such as that produced by wood fire, may be controlled with the device, while the device allows the user to begin cooking over a charcoal fire while the flames for the ignition of the charcoal are still present.

What is claimed is:
1. A cooking grill, comprising:
   a. an upper grid having a plurality of parallel channels wherein said channels are spaced apart from each other;
   b. a lower grid located below said upper grid in a plane which is generally parallel to a plane of said upper grid, having a plurality of parallel channels wherein said channels are spaced apart from each other, and wherein said channels of said lower grid are horizontally offset from said channels of said upper grid to collect grease which falls from food placed on said upper grid;
   c. means for elevating and lowering said upper grid in relation to said lower grid; and
   e. means for elevating and lowering said lower grid in relation to said upper grid, wherein the elevating and lowering of said upper grid and said lower grid in relation to each other controls a flame which is present under said lower grid to allow said flame to reach said food or prevent said same flame from reaching said food.

2. A cooking grill as described in claim 1, wherein said channels of said lower grid are U-shaped.

3. A cooking grill as described in claim 1, further comprising a grease collection means.

4. A cooking grill as described in claim 3, wherein said grease collection means comprises a tray located at one end of the channels, and a collection spout located at one end of the tray which directs grease and which opens to an exterior of a housing.

* * * * *